US008570946B2

(12) United States Patent
Schmidl et al.

(10) Patent No.: US 8,570,946 B2
(45) Date of Patent: *Oct. 29, 2013

(54) RF AND BASEBAND MEANS BUFFERING DATA UNTIL AFTER DEMODULATING CONTROL

(75) Inventors: Timothy M. Schmidl, Dallas, TX (US); Eko N. Onggosanusi, Allen, TX (US); Anand G. Dabak, Plano, TX (US); Aris Papasakellariou, Houston, TX (US); Jaiganesh Balakrishnan, Karnataka (IN); Yan Hui, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 383 days.

This patent is subject to a terminal disclaimer.

(21) Appl. No.: 12/949,442

(22) Filed: Nov. 18, 2010

(65) Prior Publication Data

US 2011/0064029 A1    Mar. 17, 2011

Related U.S. Application Data

(62) Division of application No. 11/085,305, filed on Mar. 21, 2005, now Pat. No. 7,859,985.

(60) Provisional application No. 60/555,727, filed on Mar. 22, 2004, provisional application No. 60/555,725, filed on Mar. 22, 2004.

(51) Int. Cl.
*H04W 4/00* (2009.01)

(52) U.S. Cl.
USPC ........... 370/328; 370/203; 370/431; 370/320; 370/335; 370/342; 375/132

(58) Field of Classification Search
USPC ................. 370/229, 230, 252, 310, 315, 351; 455/3.01, 400, 403, 7.26, 1, 73
See application file for complete search history.

(56) References Cited

U.S. PATENT DOCUMENTS

| | | | | |
|---|---|---|---|---|
| 5,553,098 A * | 9/1996 | Cochran et al. | ............... | 375/324 |
| 5,995,536 A * | 11/1999 | Arkhipkin et al. | ............ | 375/141 |
| 6,088,347 A * | 7/2000 | Minn et al. | ................... | 370/342 |
| 6,188,715 B1 * | 2/2001 | Partyka | ......................... | 375/134 |
| 6,717,975 B2 * | 4/2004 | Kanterakis et al. | ........... | 375/141 |
| 6,834,047 B1 * | 12/2004 | Yoon et al. | .................... | 370/342 |
| 7,042,858 B1 * | 5/2006 | Ma et al. | ........................ | 370/331 |
| 7,342,875 B2 * | 3/2008 | Hammons et al. | ............ | 370/219 |
| 2002/0039389 A1 * | 4/2002 | Chen et al. | .................... | 375/268 |
| 2002/0126768 A1 * | 9/2002 | Isaksson et al. | .............. | 375/298 |
| 2003/0147453 A1 * | 8/2003 | Batra | ............................. | 375/132 |
| 2003/0188252 A1 * | 10/2003 | Kim et al. | ..................... | 714/779 |
| 2004/0264548 A1 * | 12/2004 | Miyoshi | ........................ | 375/141 |
| 2008/0130772 A1 * | 6/2008 | Hammons et al. | ............ | 375/260 |
| 2011/0051657 A1 * | 3/2011 | Li et al. | ........................ | 370/328 |
| 2012/0188901 A1 * | 7/2012 | Struhsaker et al. | ........... | 370/252 |

* cited by examiner

*Primary Examiner* — Kibrom T Hailu
(74) *Attorney, Agent, or Firm* — Ronald O. Neerings; Wade James Brady; Frederick J. Telecky, Jr.

(57) ABSTRACT

System and method for signaling control information in a multi-carrier communications system to transmit data. A preferred embodiment comprises demodulating a first carrier that is used for transmitting a control channel transmission, determining a second carrier that is used for transmitting a data channel transmission based upon the demodulated control channel transmission, and demodulating the second carrier to obtain the data channel transmission. Additionally, designs for multi-carrier receivers are provided.

8 Claims, 4 Drawing Sheets

RF AND BASEBAND MEANS BUFFERING DATA UNTIL AFTER DEMODULATING CONTROL

This application is a divisional of application Ser. No. 11/085,305, filed Mar. 21, 2005, now U.S. Pat. No. 7,859,985, issued Dec. 28, 2010;
which claims the benefit of U.S. Provisional Application No. 60/555,727, filed Mar. 22, 2004, entitled "Downlink Signalling for 3xEV-DV" and which claims the benefit of U.S. Provisional Application No. 60/555,725, filed Mar. 22, 2004, entitled "Receiver Architectures for 3xEV-DV" which applications are hereby incorporated by reference.

TECHNICAL FIELD

The present invention relates generally to a system and method for digital communications, and more particularly to a system and method for signaling control information in a multi-carrier communications system to transmit data.

BACKGROUND

In a communications system, when a communications connection needs to be established, control information is usually shared between communicating devices to share information needed to establish the connection. The amount of control information that is exchanged can vary depending upon the flexibility of the communications system and the needs of the connection. In an inflexible communications system with a simple connection, the control information exchanged may be small, however, when a complex connection is being established in a flexible communications system, a large amount of control information may need to be exchanged. In addition to being used to establish a connection, control information may also be needed to maintain a connection. For example, control information, including acknowledgment messages (ACK/NACK), channel quality measurements, power control commands, packet structure information, configuration instructions, and so forth, are used to maintain existing connections.

In a multi-carrier communications system, wherein there can be a degree of flexibility in the way that the communications are performed, it is important that control information be passed between communications devices to properly configure the communications connection so that both communicating devices can exchange information. For example, in some multi-carrier communications systems, it is possible to vary the number of carriers used in a communications connection, the data transmission scheme (such as CDMA or OFDM), the modulation scheme (for example, QPSK, 16QAM, 64QAM, and so on), the encoding scheme, as well as a variety of other technical aspects. If the communications devices do not share as few as one of these technical aspects while establishing the connection, it is unlikely that the communicating devices will be able to successfully share information.

A commonly used technique to exchange control information in existing communications system is to code multiplex a control channel along with data channels in an existing carrier. Since in most situations, the control channel does not consume a large amount of bandwidth, the use of code multiplexing does not negatively impact the transmission bandwidth of the carrier in a significant way.

One disadvantage of the prior art is that by code multiplexing a control channel along with data channels within an existing channel, any transmission on the data channels will need to be buffered until the control channels have been decoded. This can increase hardware requirements for communications devices as well as increase overall power consumption of the communications devices.

Another disadvantage of the prior art is that while the code multiplexing of a control channel along with data channels does not significantly impact the transmission bandwidth of the data channels, some bandwidth is lost. This can lead to increased transmission times.

Yet another disadvantage of the prior art is that sharing a single carrier does not take advantage of the frequency diversity that is available in a multi-carrier communications system. The use of frequency diversity can help to increase the probability of a successful transmission, thereby potentially increasing the network bandwidth of the multi-carrier communications system as well as reducing communications latency by reducing retransmissions.

SUMMARY OF THE INVENTION

These and other problems are generally solved or circumvented, and technical advantages are generally achieved, by preferred embodiments of the present invention which provides a method for exploiting diversity in a multi-carrier communications system to improve retransmission performance.

In accordance with a preferred embodiment of the present invention, a method for obtaining a data channel transmission (DCT) in a multi-carrier communications system is provided. The method comprises demodulating a first carrier used for a control channel transmission (CCT), determining a second carrier used for the DCT based upon the demodulated CCT, and demodulating the second carrier to obtain the DCT.

In accordance with another preferred embodiment of the present invention, a multi-carrier receiver is provided. The multi-carrier receiver comprises an amplifier coupled to a signal input, the amplifier to boost a signal provided by the signal input to a desired power level, a radio frequency circuit (RFC) coupled to the amplifier, the RFC being configured to downconvert a signal at a carrier frequency to an internal frequency, a plurality of baseband circuits (BBC) coupled to the RFC, each BBC being configured to demodulate a signal provided by the RFC, wherein there is one BBC for each carrier, and an automatic retransmit request (ARQ) combiner coupled to the BBC, the ARQ combiner being configured to correct errors in the demodulated signal using retransmitted information.

An advantage of a preferred embodiment of the present invention is that frequency diversity is exploited by making use of additional carriers available in a multi-carrier communications system in the transmission of the control channel data to help improve overall network performance.

A further advantage of a preferred embodiment of the present invention is that it is possible to decode control channel information before needing to buffer transmissions on associated data channels, thereby reducing hardware buffer requirements and reducing overall power consumption. Furthermore, sharing of control channels and data channels on a single carrier may no longer be necessary, thereby allowing the data channels to fully use available carrier bandwidth to reduce transmission times.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a three-carrier multi-carrier communications system, such as 3xEV-DV, which is an extension to a single carrier communications system 1xEV-DV. 1xEV-DV is an evolution of CDMA2000 and supports voice and high-speed data using code-division multiple access (CDMA). The invention may also be applied, however, to multi-carrier communications systems in general, with no limit on the number of carriers, such as NxEV-DV (an N-carrier EV-DV system) and an extension to 1xEV-DO, yet another evolution of CDMA2000, which can be termed NxEV-DO system. Furthermore, each carrier in the multi-carrier communications system may use different modulation techniques or they may all use a single modulation technique. For example, an exemplary multi-carrier communications system may have a single carrier using CDMA modulation and remaining carriers using any combination of CDMA and orthogonal frequency division multiplexing (OFDM). In addition to using different modulations, the carriers in an exemplary multi-carrier communications system may make use of different modulation parameters, such as different spreading codes, numbers of tones, and so forth, as well as different modulations.

Figure 1:
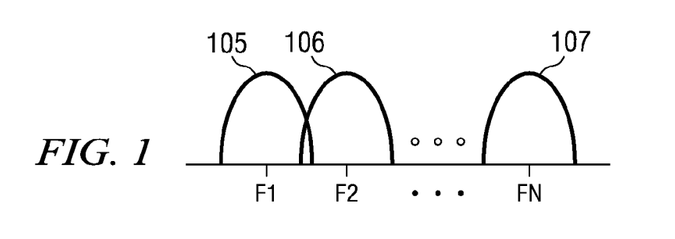
FIG. 1 is a frequency band diagram of a frequency allocation of carriers in a multi-carrier communications system.

With reference now to FIG. 1, there is shown a frequency band diagram illustrating a frequency allocation of carriers in an exemplary multi-carrier communications system. The exemplary multi-carrier communications system, as shown in FIG. 1, has N carriers, wherein N is an integer number. Each carrier in the exemplary multi-carrier communications system, such as carrier #1 105, carrier #2 106, and carrier #N 107, can span a particular frequency range. Each frequency band can have a center frequency, frequency f1 for carrier #1 105, for example, as well as a certain bandwidth. Each band can have a different bandwidth, the same bandwidth, or combinations thereof. Advantages arising from using multiple carriers rather than a single carrier can include compatibility with legacy systems, the use of different data transmission schemes and modulation schemes in different carriers, the ability to skip certain portions of the spectrum that may already be in use, and so forth.

Figure 2:
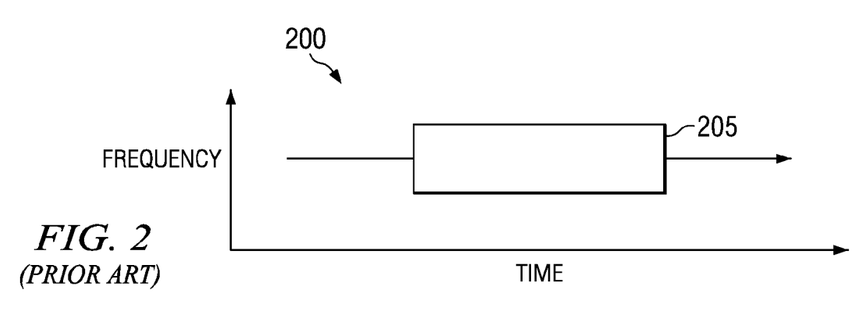
FIG. 2 is a time-frequency diagram of a prior art technique for multiplexing a control channel transmission with a data channel transmission.

With reference now to FIG. 2, there is shown a time-frequency diagram illustrating a prior art technique of using code multiplexing to share a control channel with a data channel. The time-frequency diagram 200, as shown in FIG. 2, illustrates a transmission 205 that is made up of a control channel and a data channel with sharing accomplished by code multiplexing. There is no clear delineation between the control channel and the data channel in the time-frequency space. The diagram shown in FIG. 2 with code multiplexing could be an illustration of control channel and data channel sharing a single carrier in a 1xEv-DV communications system, for example. As shown in FIG. 2, both the control channel and the data channel share a single carrier. The sharing of the single carrier can be accomplished by code multiplexing (multiplying contents of the control channel and the data channel with orthogonal codes so that there is no interference between transmissions on the two channels).

Figure 3:
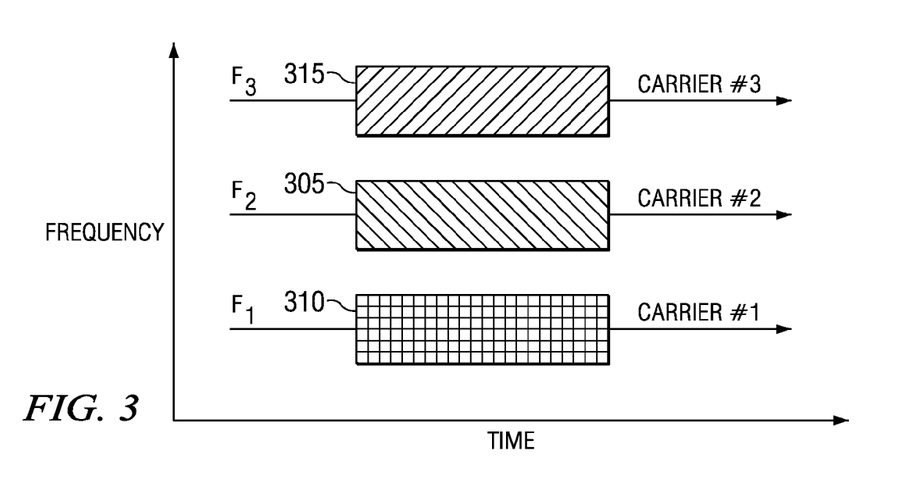
FIG. 3 is a time-frequency diagram of a technique for sharing a control channel transmission with a data channel transmission on a single carrier in a multi-carrier communications system, according to a preferred embodiment of the present invention.

With reference now to FIG. 3, there is shown a time-frequency diagram illustrating a technique for sharing a control channel transmission and a data channel transmission on a single carrier in a multi-carrier communications system, according to a preferred embodiment of the present invention. As shown in FIG. 3, the time-frequency diagram illustrates a three carrier multi-carrier communications system, wherein a single communications connection can make use of up to three carriers. However, the technique illustrated can be applicable with a multi-carrier communications system with any number of carriers, such as two, four, five, and so on. The time-frequency diagram illustrates three carriers, each with a transmission. A first transmission 305 on carrier #2, a second transmission 310 on carrier #1, and a third transmission 315 on carrier #3. The multi-carrier communications system, whose transmissions are shown in FIG. 3, uses code multiplexing to share a control channel with a data channel on carrier #2, although this is not clearly displayable in FIG. 3.

Since the control channel is code multiplexed with the data channel on carrier #2, carriers #1 and #3 can be used exclusively for data channel traffic. Because the control channel and the data channel are transmitted simultaneously on carrier #2, the contents of the data channel transmission on carrier #2 (the first transmission 305) needs to be buffered until the control channel can be sufficiently decoded to permit the demodulation of the data channel transmissions. Note that the transmissions on carriers #1 and #3 (the second transmission 310 and the third transmission 315) may also need to be buffered in case the data transmission is also multiplexed onto the carrier #1 and/or carrier #3. As shown in FIG. 3, the multi-carrier communications system is configured for use wherein a data channel transmission is multiplexed across the three carriers and there is a single control channel transmission to convey necessary control channel information for the data channel transmission.

Instead of transmitting the control channel transmission and the data channel transmission multiplexed on a fixed carrier, the multiplexed control channel transmission and the data channel transmission can be transmitted on a carrier with a highest channel quality indicator (CQI). The selection of the carrier with the highest CQI to transmit the control channel transmission will improve the reliability of the control channel transmission. Since the channel quality indicator is periodically updated by each receiver in the multi-carrier communications network, the multi-carrier receiver should know what carrier to monitor for the control channel transmission. The transmitter can transmit the control information on the carrier that is best for the particular multi-carrier receiver that is the intended recipient of the control information.

Figure 4:
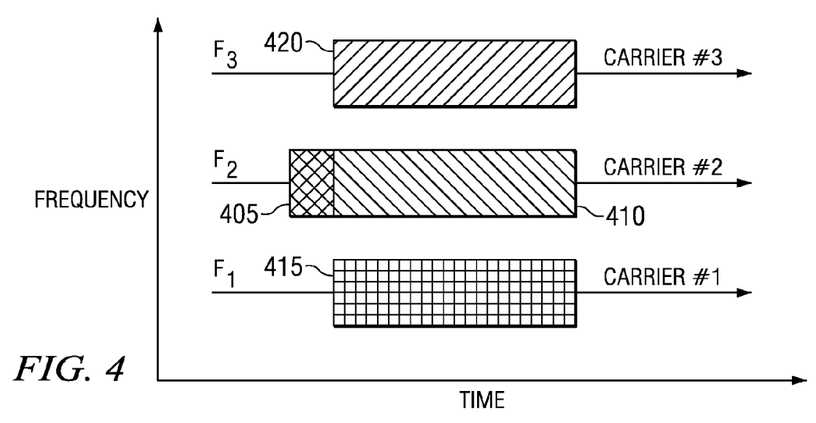
FIG. 4 is a time-frequency diagram of a technique for sharing a control channel transmission and a data channel transmission on a single carrier in a multi-carrier communications system, according to a preferred embodiment of the present invention.

With reference now to FIG. 4, there is shown a time-frequency diagram illustrating a technique for sharing a control channel transmission and a data channel transmission on a single carrier in a multi-carrier communications system, according to a preferred embodiment of the present invention. Rather than transmit the control channel along side the data channel using either code multiplexing or frequency multiplexing as disclosed in FIG. 3, the technique illustrated in FIG. 4 transmits a control channel transmission 405 that is followed by a data channel transmission 410 on a single carrier (carrier #2). If data channel transmissions are multiplexed across multiple carriers (or even if it is not), data channel transmissions 415 and 420 can take place on carriers #1 and #3 at the same time as the data channel transmission 410. If the data channel transmissions are not multiplexed across multiple carriers, meaning that data channel transmissions 415 and 420 are intended for other connection(s), then the control channel transmission 405 can have necessary control channel information regarding the other connection(s). Note that the data channel transmissions 415 and 420 might not start until the control channel transmission 405 completes so that it may not be necessary to buffer the transmissions.

Time multiplexing is used so that the control channel transmission 405 is transmitted prior to the data channel transmission 410 and does not actually share any carrier bandwidth with the data channel transmission 410. As such, it is possible for a receiver of the transmission to decode the control channel transmission 405 and determine if it needs to listen to the data channel transmission 410 and/or data channel transmissions 415 and 420. If the receiver determines that it does not need to listen to some or all of the carriers, it can turn off all or part of its receive circuitry to save power. As shown in FIG. 4, the multi-carrier communications system is configured for use wherein a data channel transmission is multiplexed across the three carriers and there is a single control channel transmission to convey necessary control channel information for the data channel transmission, with an added advantage of not requiring the buffering of data channel transmissions until sufficient decoding of the control channel transmission has been accomplished to accurately determine the intended recipient of the data channel transmission as well as what is needed to demodulate the data channel transmission. This can reduce or possibly eliminate signal buffering at the multi-carrier receiver.

Figure 5:
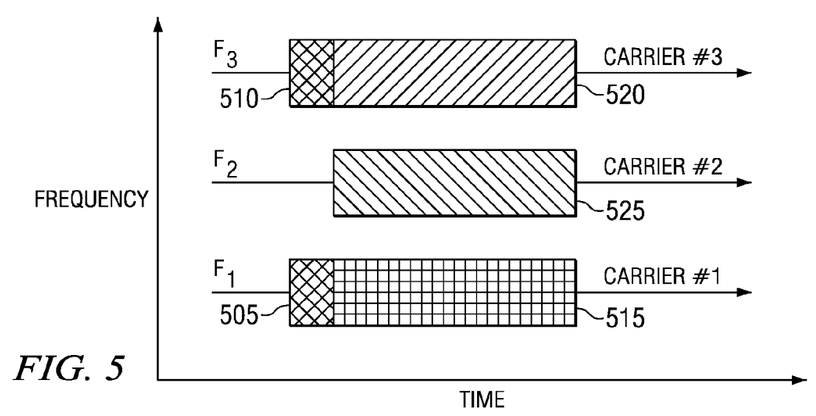
FIG. 5 is a time-frequency diagram of a technique for sharing a control channel transmission and a data channel transmission on a single carrier in a multi-carrier communications system, according to a preferred embodiment of the present invention.

With reference now to FIG. 5, there is shown a time-frequency diagram illustrating a technique for sharing a control channel and a data channel in a multi-carrier communications system, according to a preferred embodiment of the present invention. As shown in FIG. 5, the time-frequency diagram illustrates a pair of control channel transmissions, a first control channel transmission 505 on carrier #1 and a second control channel transmission 510 on carrier #3. According to a preferred embodiment of the present invention, the first control channel transmission 505 and the second control channel transmission 510 are actually a part of a single control channel transmission that has been multiplexed across multiple carriers. As such, both the first control channel transmission 505 and the second control channel transmission 510 contain control channel information regarding data channel transmissions 515 and 520, which are transmitted after transmission of the first control channel transmission 505 and the second control channel transmission 510. Additionally, depending upon the configuration of the multi-carrier communications system, the first control channel transmission 505 and the second control channel transmission 510 may also contain control channel information regarding data channel transmission 525 on carrier #2.

The multi-carrier communications system, as displayed in FIG. 5, also includes the carrier #2, which can be used to maintain compatibility with a legacy communications system, such as 1xEV-DV. The time-frequency diagram illustrates a transmission 525 on carrier #2, which includes both a control channel transmission and a data channel transmission. The transmissions are code multiplexed so that they do not interfere with each other. The control channel transmission transmitted on carrier #2 may contain only information about data channel transmissions carried on carrier #2 or it may contain information about data channel transmissions carried on carriers #1 and #3 (in conjunction with control channel transmissions 505 and 510), depending upon the configuration of the multi-carrier communications system.

While the carrier #2 uses code multiplexing and carriers #1 and #3 use time multiplexing to transmit control channel transmissions, it remains possible for a single data channel transmission to use all three carriers. For example, a data channel transmission can be partitioned into three portions and control channel information can be generated for the transmission. The control channel information may be partitioned into two parts as well, a first part may contain information regarding the portion of the data channel transmission to be transmitted on the carrier #2 (to be transmitted in transmission 525) and a second part may contain regarding the portion of the data channel transmission to be transmitted on carriers #1 and #3 (to be multiplexed across carriers #1 and #3 and transmitted in control channel transmissions 505 and 510). At a receiver, the control channel transmissions 505 and 510 can be decoded to permit the demodulation of the data channel transmissions 515 and 520, while the transmission 525 may need to be buffered in its entirety to allow for the decoding of the control channel transmission and the demodulation of the data channel transmission that shares the transmission 525 with the control channel transmission.

As shown in FIG. 5, the multi-carrier communications system is configured for use wherein a data channel transmission is multiplexed across a pair of carriers and there is a single carrier available for use in a compatibility mode as well as providing additional transmission bandwidth if needed. The data channel transmission multiplexed across a pair of carriers can have its own control channel transmission to enable conveyance of necessary control channel information. The carrier used for the compatibility mode can have its own control channel as needed.

Figure 6:
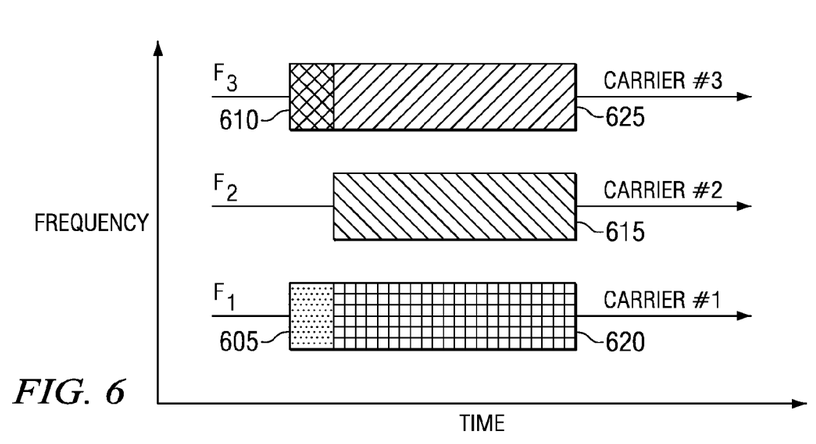
FIG. 6 is a time-frequency diagram of a technique for sharing a control channel transmission and a data channel transmission on a single carrier in a multi-carrier communications system, according to a preferred embodiment of the present invention.

With reference now to FIG. 6, there is shown a time-frequency diagram illustrating a technique for sharing a control channel and a data channel in a multi-carrier communications system, according to a preferred embodiment of the present invention. As shown in FIG. 6, the time-frequency diagram illustrates a pair of control channel transmissions, a first control channel transmission 605 on carrier #1 and a second control channel transmission 610 on carrier #3. Differing from the situation described in FIG. 5, the first control channel transmission 605 and the second control channel transmission 610 are separate control channel transmissions. The first control channel transmission 605 contains control channel information related to its own data channel transmission and the second control channel transmission 610 contains control channel information related to its own data channel transmission. A transmission 615 on carrier #2 can be used to provide compatibility support for legacy communications systems, such as 1xEv-DV, makes use of either frequency multiplexing or code multiplexing to share available carrier bandwidth with a control channel and a data channel.

According to a preferred embodiment of the present invention, the first control channel transmission 605 on carrier #1 contains control channel information related to a data channel transmission 620, also on carrier #1 and the second control channel transmission 610 on carrier #3 contains control channel information related to a data channel transmission 625, also on carrier #3. As shown in FIG. 6, the multi-carrier communications system is configured for use wherein each carrier has its own data channel transmission and one of the carriers provides a compatibility mode for a legacy communications system. Note that it may be possible to have a data channel transmission be multiplexed across multiple carriers with a minor reconfiguration in the way that the control channel transmissions 605 and 610 are made.

Figure 7:
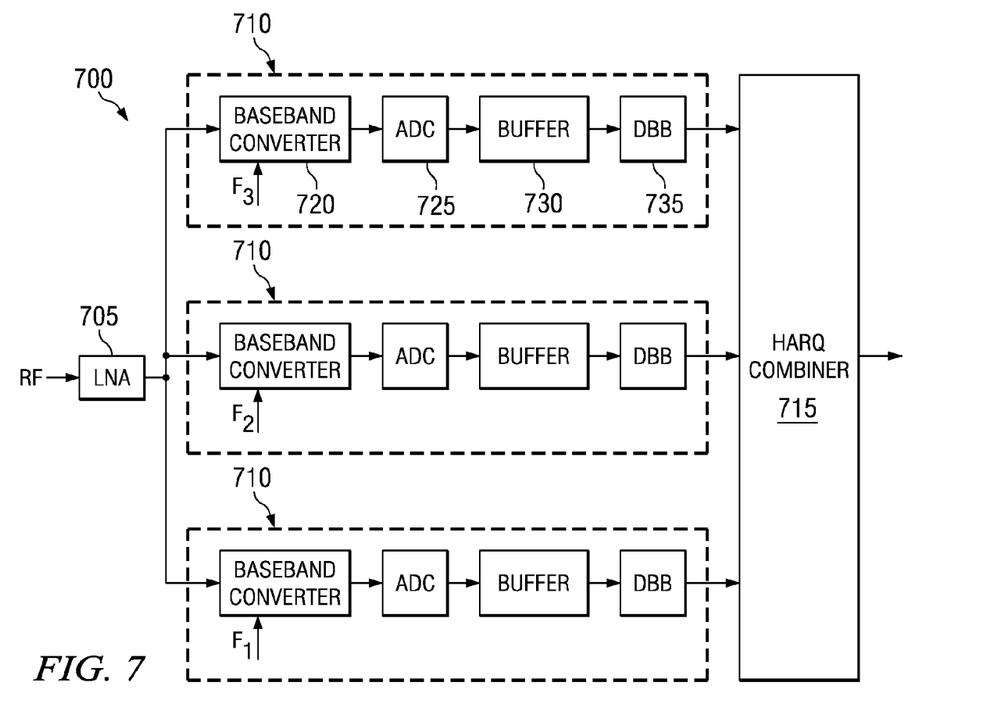
FIG. 7 is a diagram of a multi-carrier receiver, according to a preferred embodiment of the present invention.

With reference now to FIG. 7, there is shown a diagram illustrating a receiver 700 for a multi-carrier communications system, according to a preferred embodiment of the present invention. The diagram shown in FIG. 7 illustrates a portion of a receiver that can be used in a multi-carrier communications system. Illustrated are circuitry that can be used to take a radio frequency (RF) signal, such as provided by an antenna (not shown), and convert it into digital data that can be decoded, error corrected, and so forth. The receiver 700, as shown in FIG. 7, can be used in a three carrier multi-carrier communications system. However, with small modifications to the design, the receiver 700 can be used in a multi-carrier communications system with a different number of carriers, such as two, four, five, and so forth.

The receiver 700 includes an amplifier 705, preferably a low-noise amplifier (LNA), which can be used to amplify the RF signal (provided by an antenna) to a power level that is compatible with circuitry in the remainder of the receiver 700. From the LNA 705, the amplified RF signal can be provided to a plurality of RF and baseband circuits (RFBB) 710. According to a preferred embodiment of the present invention, the receiver 700 has one RFBB 710 for each carrier in the multi-carrier communications system. The receiver 700 has three RFBBs 710, so the receiver 700 can operate in a multi-carrier communications system with at most three carriers. The receiver 700 can also operate to receive up to three carriers in a multi-carrier communication system with more than three carriers. The plurality of RFBBs 710 provides outputs that can be provided to a hybrid automatic retransmission request (HARQ) combiner 715, which can basically be a memory that can be used to permit the reconstruction of transmissions with errors using retransmitted information. Output from the HARQ combiner 715 can be provided to circuitry that can perform tasks such as decoding, processing, and so on.

Each of the RFBBs 710 can include a baseband converter 720, which can be used to downconvert the amplified RF signal to an appropriate frequency. The baseband converter 720 can have as a second input, an operating frequency of a carrier that it is assigned to convert, for example, the baseband converter 720 has as its second input, the operating frequency of carrier #3, labeled "$f_3$." After downconversion, an analog-to-digital converter (ADC) 725 can be used to convert the downconverted RF signal into its digital representation. A buffer (optional) 730 can be used to store the digitized RF signal, while waiting for the decoding of a control channel transmission, for example. A digital baseband circuit (DBB) 735, having an input connected to an output of the optional buffer 730 or the ADC 725, is responsible for performing operations on the digitized RF signal such as despreading, error checking, error correcting, decoding, and so forth. The DBB can have an output coupled to the HARQ combiner 715.

The downconversion of the amplified RF signal to appropriate frequencies can enable the ADC 725 to operate at a frequency that can be significantly lower than if an ADC were to attempt to digitize the amplified RF signal prior to downconversion. It may not be feasible to have an ADC operate at the required frequency, and operating at high frequency also implies greater power consumption.

An advantage of the use of the RFBBs 710 in the receiver 700 is that existing RFBB designs, such as one for a legacy single carrier receiver for a single carrier communications system, for example, an RFBB for a 1xEV-DV compatible communications system, can simply be replicated for use in the receiver 700. This can shorten receiver design and test time and permit a manufacturer to rapidly bring to market a multi-carrier receiver. Furthermore, since the basic design of the receiver 700 already exists, the manufacturer can reduce the cost of the receiver 700, allowing the receiver 700 to be brought to market at a lower price point and providing the manufacturer with a competitive advantage over competitors.

Figure 8:
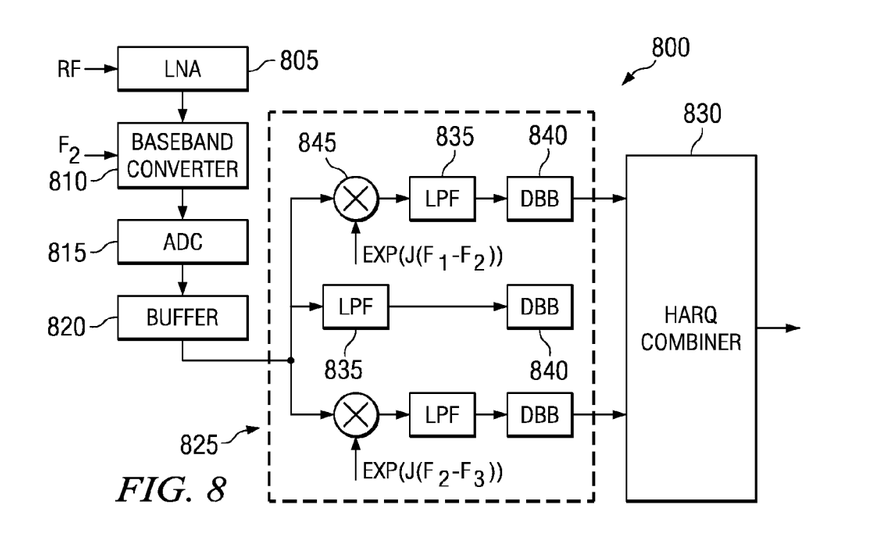
FIG. 8 is a diagram of a multi-carrier receiver, according to a preferred embodiment of the present invention.

With reference now to FIG. 8, there is shown a diagram illustrating a receiver 800 for a multi-carrier communications system, according to a preferred embodiment of the present invention. The receiver 800, as shown in FIG. 8, can be used in a three carrier multi-carrier communications system. However, with small modifications to the design, the receiver 800 can be used in a multi-carrier communications system with a different number of carriers, such as two, four, five, and so forth. The receiver 700 (FIG. 7) allows the use of existing hardware circuitry to permit the rapid design, test, and manufacture of a multi-carrier receiver. However, the simple replication of existing hardware circuits can lead to an inefficient design if area and power consumption issues are not properly addressed.

The receiver 800 addresses area and power consumption issues by having a single RF unit instead of multiple RF units as in the receiver 700. The RF unit of the receiver 800 includes an amplifier 805 (again, preferably a low-noise amplifier) that can be used to amplify an RF signal (provided by an antenna) to a power level that is compatible with circuitry in the remainder of the receiver 800. A baseband converter 810, similar to the baseband converter 720, downconverts the amplified RF signal to an appropriate frequency. With the baseband converter 810, a second input is provided an operating frequency of a carrier. As shown in FIG. 8, the second input of the baseband converter 810 is provided the operating frequency of carrier #2. Note that operating frequencies from other carriers in the multi-carrier communications system can be used. However, it is preferred that the operating frequency provided to the baseband converter 810 be at or near the middle of the operating frequencies for all carriers.

The downconverted RF signal can then be digitized by an ADC 810 and stored in an optional buffer 820. Output from the optional buffer 820 or the ADC 815 can then be provided to a digital baseband unit 825, which can contain baseband circuitry to process signals from each of the individual carriers. From the digital baseband unit 825, a HARQ combiner 830 can be used to permit the reconstruction of transmissions with errors using retransmitted information. Output from the HARQ combiner 830 can be provided to circuitry that can perform tasks such as decoding, processing, and so forth.

The digital baseband unit 825 can contain a plurality of baseband circuits, preferably one baseband circuit for each carrier. There may be several basic designs for the baseband circuits, a first baseband circuit design to specifically process the RF signal in the carrier whose operating frequency was provided to the baseband converter 810 and a second baseband circuit design to process the RF signal in other carriers used in the multi-carrier communications system. For the first baseband circuit design, since the baseband converter 810 has already performed the downconversion of the RF signal to the operating frequency of the carrier whose operating frequency was provided to the baseband converter 810, the first baseband circuit design includes a filter 835 (preferably a low-pass filter (LPF)) that can be used to eliminate portions of the RF signal outside of the carrier. Output from the filter 835 can then be provided to a digital baseband circuit (DBB) 840 can be responsible for performing operations on the digitized RF signal such as despreading, error checking, error correcting, decoding, and so forth.

The second baseband circuit design can include a multiplier 845 that may be used to perform a complex derotation of the RF signal. According to a preferred embodiment of the present invention, the complex derotation is performed with an amount that is proportional to a difference in the operating frequency of a carrier of interest and the operating frequency of the carrier provided to the baseband converter 810. For example, as shown in FIG. 8, the complex derotation for a RF signal for carrier #1 is equal to the operating frequency of carrier #1, $f_1$, minus the operating frequency of the carrier provided to the baseband converter 810, $f_2$. After the complex derotation by the multiplier 845, the RF signal can be filtered by the filter 835 and then provided to the DBB 840, similar to the first baseband circuit design.

An advantage of the receiver 800 is that it reduces power consumption by decreasing the number of baseband converters, ADCs, and optional buffers. In addition to reducing power consumption, the overall area of the receiver 800 is also reduced. Therefore, it may be possible for the manufacturer to produce a multi-carrier receiver with lower power consumption as well as a physically smaller package.

The multi-carrier receivers presented in FIGS. 7 and 8 can be used with the various control channel and data channel sharing techniques discussed above. Depending upon the sharing techniques used, one of the multi-carrier receivers may operate with more efficiency than the other.

Figure 9A:
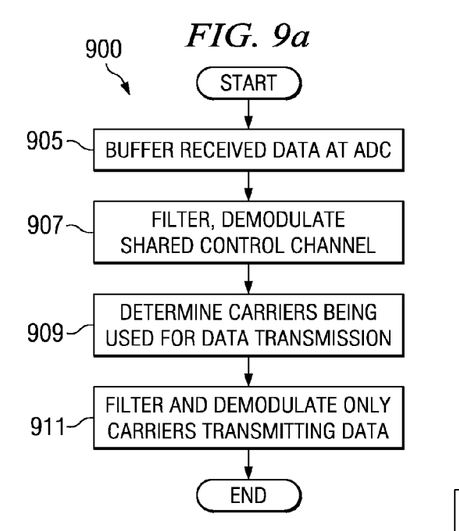
FIGS. 9*a* through 9*c* are diagrams of sequences of events in the demodulation of a control channel transmission to demodulate a data channel transmission, according to a preferred embodiment of the present invention.

With reference now to FIG. 9a, there is shown a diagram illustrating a sequence of events 900 in demodulating a control channel transmission and then using information in the control channel to demodulate a data channel transmission, wherein the control channel transmission is multiplexed with the data channel transmission, according to a preferred embodiment of the present invention. The sequence of events 900 is descriptive of events in the demodulation of a control channel transmission after an RF signal has been amplified, converted to baseband, and digitized, in other words, the sequence of events 900 describes events occurring in a multi-carrier receiver after the ADC 725 (FIG. 7) or 815 (FIG. 8).

Since the control channel transmission and the data channel transmission are multiplexed onto a single carrier of the multi-carrier communications system, it is necessary to buffer the output of the ADC so that data carried in the RF signal is not lost (block 905). Depending upon the architecture of the multi-carrier receiver, it may be necessary to buffer the digitized RF signal associated with other carriers if the carrier is being used to multiplex the data channel transmission. For example, with the receiver 700 (FIG. 7), if three carriers are used to multiplex the data channel transmission, it may be necessary to buffer the digitized RF signal from all three carriers, while with receiver 800 (FIG. 8), the buffering in block 905 is sufficient to prevent data loss.

After buffering the digitized RF signal (block 905), the control channel transmission can be filtered and demodulated (block 907). This can then be followed with the determination of the carriers used to carry the data channel transmission (block 909). Out of the multiple carriers, one or more carriers can be used to carry the data channel transmission. Until the control channel transmission is demodulated, it is not possible to determine the number and identity of the carriers. Once the number and identities of the carriers used to carry the data channel transmission is determined, the multi-carrier receiver can be configured to filter and demodulate only those carriers that are carrying the data channel transmission (block 911). Circuitry for carriers that are not used to carry the data channel transmission can now be powered down to reduce power consumption. The configuration of the multi-carrier receiver can remain unchanged until the data channel transmission completes or until additional information is conveyed via a control channel transmission that would require a re-configuration of the multi-carrier receiver.

Figure 9B:
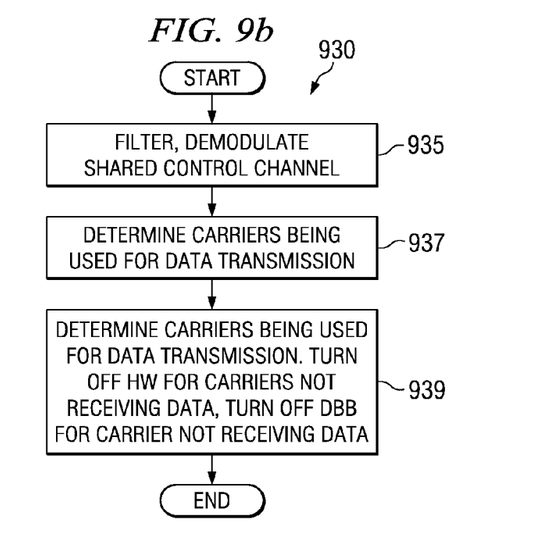

With reference now to FIG. 9b, there is shown a diagram illustrating a sequence of events 930 in demodulating a control channel transmission and then using information in the control channel to demodulate a data channel transmission, wherein the control channel transmission is transmitted prior to the data channel transmission, according to a preferred embodiment of the present invention. Since the control channel transmission is transmitted prior to the transmission of the data channel transmission, it may be possible to demodulate the control channel transmission prior to the arrival of the data channel transmission.

Without having to buffer either the control channel transmission or the data channel transmission, the control channel transmission can be filtered and demodulated as it arrives (after amplification and digitization) at the multi-carrier receiver (block 935). With the control channel transmission demodulated, it is now possible to determine the number and identities of the carriers used to carry the data channel transmission (block 937). Once the number and identities of the carriers used to carry the data channel transmission is determined, the multi-carrier receiver can be configured to filter and demodulate only those carriers that are carrying the data channel transmission (block 939). Since the carriers carrying the data channel transmission can be determined prior to the arrival of the data channel transmission, it can be possible to turn off circuitry for carriers that are not carrying the data channel transmission while only leaving on the circuitry for the carriers that are carrying the data channel transmission. This can enable a significant power consumption reduction compared to the situation where the control channel transmission and the data transmission are multiplexed together since it is not necessary to buffer the digitized RF signal and unneeded circuitry is turned off.

Figure 9C:
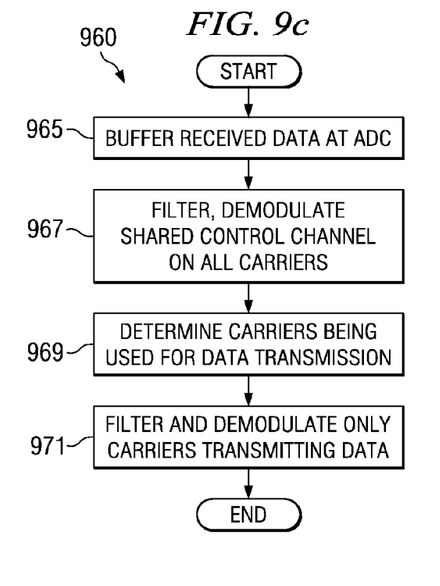

With reference now to FIG. 9c, there is shown a diagram illustrating a sequence of events 960 in demodulating a control channel transmission and then using information in the control channel to demodulate a data channel transmission, wherein the control channel transmission and the data channel transmission are multiplexed together and across multiple carriers, according to a preferred embodiment of the present invention. Since the control channel transmission and the data channel transmissions are not only multiplexed with each other, they are also multiplexed across multiple carriers, the digitized RF signal will be buffered to ensure that data is not lost while the control channel transmission is being received (block 965). Because the control channel transmission can be present on all carriers, it may be necessary to filter and demodulate the control channel transmission on all carriers (block 967). The multi-carrier receiver may not actually receive all carriers, but it will filter and demodulate the control channel transmission on all carriers intended for it. After the control channel transmissions have been demodulated, the number and identities of carriers carrying the data channel transmission can be determined (block 969). Note that it may be necessary to combine the demodulated control channel transmission from the various carriers before the determination can take place. Once the number and identities of the carriers carrying the data channel transmission has been determined, only the digitized RF signals from those carriers need to be filtered and demodulated to obtain the data (block 971). The circuitry for carriers that are not used to carry the data channel transmission can be powered down to reduce power consumption.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A multi-carrier communications system comprising:
    A. first RF and baseband means receiving a first carrier signal at a first carrier frequency for a first time period, the first carrier signal providing compatibility with a legacy communications system, the receiving a first carrier signal including receiving a multiplexed control channel with a data channel;
    B. second RF and baseband means receiving a second carrier signal at a second carrier frequency different from the first carrier frequency, the receiving a second carrier signal including receiving a control channel at a time period prior to the first time period and receiving a data channel at a time period the same as the first time period;
    C. third RF and baseband means receiving a third carrier signal at a third carrier frequency different from the first and second carrier frequencies, the receiving a third carrier signal including receiving a control channel at a time period prior to the first time period and receiving a data channel at a time period the same as the first time period;
    D. the second and third RF and baseband means filtering and demodulating the second and third received carrier signals to receive control information on a control channel; and
    E. the first RF and baseband means buffering the data channel of the first carrier signal until after demodulating control information in the control channel of the first carrier signal.

2. The system of claim 1 in which the first carrier signal is a legacy carrier signal.

3. The system of claim 1 in which the first carrier frequency corresponds to a 1xEV-DV single carrier communications system.

4. The system of claim 1 in which the first, second, and third carrier frequencies correspond to a 3xEV-DV carrier communications system.

5. The system of claim 1 in which the control channel and the data channel of the first carrier signal are code multiplexed together.

6. The system of claim 1 in which control information is multiplexed over the second and third carrier signals.

7. The system of claim 1 in which data is multiplexed over plural carrier signals.

8. The system of claim 1 including automatic retransmit request combiner means coupled to the first, second, and third RF and baseband means for correcting errors in the demodulated signal using retransmitted information.

* * * * *